(12) United States Patent
Kaplan et al.

(10) Patent No.: US 6,211,257 B1
(45) Date of Patent: *Apr. 3, 2001

(54) OPEN CELLED POLYURETHANE FOAMS AND METHODS AND COMPOSITIONS FOR PREPARING SUCH FOAMS

(75) Inventors: Warren Kaplan; Paul Neill, both of Grayslake, IL (US)

(73) Assignee: Stepan Company, Northfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/571,669

(22) Filed: May 15, 2000

Related U.S. Application Data

(63) Continuation of application No. 08/973,128, filed on Apr. 14, 1996, now Pat. No. 6,066,681, which is a continuation of application No. PCT/US96/07664, filed on May 24, 1996, which is a continuation of application No. 08/451,722, filed on May 26, 1995, now abandoned.

(51) Int. Cl.$^7$ ..................................................... C08G 18/00
(52) U.S. Cl. ............................ 521/125; 521/172; 521/176
(58) Field of Search .................................... 521/125, 172, 521/176

(56) References Cited

U.S. PATENT DOCUMENTS 5,212,209 * 5/1993 Weaver ................................ 521/125
5,457,138 * 10/1995 Yuge et al. ........................... 521/125

* cited by examiner

*Primary Examiner*—Morton Foelak
(74) *Attorney, Agent, or Firm*—McDonnell Boehnen Hulbert & Berghoff

(57) ABSTRACT

Disclosed are methods and compositions for preparing polyurethane foams using emulsified polyol mixture comprising
  (a) a polyol formulation comprising a polyester polyol having an OH value of from about 150 to 350; and
  (b) a cell opening agent.

15 Claims, No Drawings

OPEN CELLED POLYURETHANE FOAMS AND METHODS AND COMPOSITIONS FOR PREPARING SUCH FOAMS

This is a continuation of application Ser. No. 08/973,128, filed Apr. 14, 1998, now U.S. Pat. No. 6,066,681, which is a continuation of PCT/US96/07664, filed May 24, 1996; which is a continuation of Ser. No. 08/451,722 filed May 26, 1995, now abandoned.

BACKGROUND OF THE INVENTION

1. Field of the Invention

This invention relates to polymers and specifically to rigid polyurethane foams. Even more specifically, the invention relates to open celled rigid polyurethane foams and to methods and compositions for their preparation. The invention further relates to the use of such foams as insulation materials.

2. Description of the Related Art

In the manufacture of refrigeration cabinets, picnic coolers, doors, and other insulated containers, polyurethane foam is poured in place between two substrates defining a cavity.

There are several desirable criteria that a polyurethane foam should meet in pour in place foaming applications. One criteria is that an alternative blowing agent to ozone depleting CFCs and HCFCs is needed. A second requirement is that the polyurethane foam should flow well so that the entire cavity is filled with the foam. If the foam prematurely gels, voids will form behind the prematurely gelled foam where the foaming mass could not reach. A third requirement is to use the least amount of raw foaming material to fill a particular cavity to save on raw material costs. To adequately fill all portions of the cavity and prevent the presence of voids, it is often necessary to overpack the cavity. The less overpacking that is necessary to completely fill the mold, however, the greater the savings in raw material costs. Thus, it is desired to form a polyurethane-filled container having the lowest density possible.

Many polyurethane foam manufacturers are now turning to water as the sole source of blowing agent instead of CFCs or HCFCs. For example, in the field of cooling containers where the foam is poured in place, water-blown rigid polyurethane foams present a unique problem. Rigid polyurethane foams blown with water tend to be closed-celled foams which shrink and pucker over a period of time after foaming and during cure. This is partly due to the migration of carbon dioxide gas, produced by the water reaction with polyisocyanate, out of the closed cells and leaving behind a vacuum which then tightens and shrinks the foamed mass over time. Foam which shrinks in foamed-in-place applications will either pull away from a substrate, or continue to adhere to the inner surface of the substrates causing waviness and surface deformities on the substrate. The problem of foam shrinkage in CFC-blown and HCFC-blown foams has not been as acute since CFC gases tend to migrate out of the closed cells very slowly over a period of months or years, if at all, resulting in a minimized pressure gradient within the foam.

The problem of foam shrinkage or dimensional stability is more severe in applications such as picnic coolers where the coolers are often subject to wide temperature variations, from indoor 70°–80° F. temperatures to beach temperatures in direct sun which may climb to 110°–120° F., causing the gas in the cells to further expand and diffuse out.

It is also desired to produce a foam having a lower density yet which fully fills the cavity and is dimensionally stable to lower raw material costs. Lowering the density, however, especially in water-blown foam already having a tendency to shrink has the attendant disadvantage of further exacerbating the dimensional instability of the foam.

Traditional closed-cell water blown foam requires an in-place density of at least 2.4 pounds/ft$^3$ (pcf) to possess enough polymer strength to withstand the tendency to shrink. As a result the use of all water blown foam has not been economically desirable since an HCFC blown foam can fill a cavity with dimensionally stable foam at about 2.0 pcf, resulting in a significant cost advantage for materials. Moreover, conventional closed cell water blown foam requires large amounts of more expensive high functional polyether polyol to provide the polymer cross linking necessary for dimensional stability.

Open celled foams have been described in U.S. Pat. Nos. 5,214,076; 5,219,893; 5,250,579; 5,262,447; 5,318,997; 5,346,928; and 5,350,777, each of which is incorporated herein in its entirety.

SUMMARY OF THE INVENTION

The invention provides dimensionally stable, low density, all water blown polyurethane foams that are prepared primarily with low functional polyester polyols. These foams have an open cell content sufficient to prevent shrinkage of the foam. Further, the inventive foams are of a strength sufficient to prevent shrinkage of the foam.

The inventive foams are produced using cell opening agents having melting points or softening points between about 100 and 180° C. When formulated according to the invention, these cell opening agents form part of an emulsified polyol mixture having an emulsion droplet or particle size of less than about 50$\mu$. Without being bound by a particular theory, it is believed that during the polymerization reaction, the emulsion containing the cell opener breaks down releasing the cell opener thus allowing controlled cell opening. Without being bound by particular theory, it is believed that cell opening takes place immediately prior to polymer gelation.

The resulting low density, water blown foam is primarily an open celled foam and exhibits dimensional stability in both the free rise state as well as within a packed cavity.

The foams of the invention may be used in a variety of applications including, for example, doors, picnic coolers, water heaters, refrigerators, or other cavities requiring a material of moderate insulating ability.

It has been unexpectedly discovered that the addition of an acid to a combination of a polyol, a blowing agent that may be water, and a specific cell opening agent provides an emulsified polyol blend that has surprising stability. The emulsified polyol blends, when reacted with aromatic isocyanates, form open-celled, pour-in-place urethane foams having excellent dimensional stability at low densities. The obtention of such dimensional stability at the densities of the invention is unprecedented in water-blown foams made using high amounts, i.e., greater than about 60% by weight of the polyols, of polyester polyol.

Thus, the invention encompasses methods and compositions for preparing polyurethane foams having strength and an open-cell content sufficient to prevent or resist shrinkage comprising reacting an aromatic polymeric isocyanate with an emulsified polyol mixture. The emulsified polyol mixture of the invention comprises (a) a polyol formulation comprising a polyol having an OH value of from about 150 to 500;

(b) a blowing agent;

(c) a cell opening agent which is a divalent metal salt of a long chain fatty acid; and (d) an acid.

The polyol formulation may contain up to about 100% by weight of the formulation of either a polyether polyol or a polyester polyol.

The invention also provides emulsified polyol mixtures comprising a polyol formulation containing high levels, i.e., up to about 100% by weight of the formulation, of a polyester polyol, together with a blowing agent and a cell opening agent. Optionally, the polyol mixtures of the invention may comprise an emulsifier.

DETAILED DESCRIPTION OF THE INVENTION

In this document, all temperatures will be stated in degrees Celsius. All amounts, ratios, concentrations, proportions and the like will be stated in weight units, unless otherwise stated, except for ratios of solvents, which are in volume units.

By OH value is meant hydroxyl value, a quantitative measure of the concentration of hydroxyl groups, usually stated as mg KOH/g, i.e., the number of milligrams of potassium hydroxide equivalent to the hydroxyl groups in 1 g of substance.

By NCO/OH index is meant the molar ratio, multiplied by 100, of isocyanate groups to hydroxyl groups (including those contributed by water) in the reaction between the polyol blend and the polyisocyanate.

By functionality is meant the number of reactive groups, e.g., hydroxyl groups, in a chemical molecule.

By uniform open cell content is meant a polyurethane foam having an average open cell content that does not vary substantially between two or more samples removed from the same foam material and separated in the foam material by a distance of at least about 2 cm.

By emulsified polyol mixture as used herein is meant a mixture comprising polyol, cell opening agent, acid, and blowing agent having droplets of the cell opening agent having an average mean diameter of less than about $50\mu$ stably suspended in the polyol mixture. Such an emulsion is stable for a period of time sufficient to allow reaction with the polyisocyanate and form an open-celled foam having an open-cell content sufficient to prevent or resist shrinkage. Such an emulsion is stable at a temperature of about 25° C. for at least about 1 week and more preferably at least about 3 months. The excellent stability of the emulsions of the invention is surprisingly obtained when an acid is added to the polyol blend.

By softening point as used herein is meant a temperature at which a material becomes more liquid, less rigid, softer, or more elastic; i.e., a temperature at or above its glass transition temperature.

As used herein, resistance to shrinkage means less than about 5% shrinkage of a polyurethane foam material.

By stable emulsion as used herein is meant an emulsion having droplets or particles of the cell opening agent having an average mean diameter of less than about $50\mu$ stably suspended in the polyol mixture. Such an emulsion is stable for a period of time sufficient to allow reaction with the polyisocyanate and form an open-celled foam having an open-cell content sufficient to prevent or resist shrinkage. Particularly preferred emulsions according to the invention are stable for at least about 1 week and more preferably at least about 3 months at a temperature of about 25° C. As noted above, the stability of the emulsions and the resulting dimensional stability of the final foams of the invention is surprisingly obtained when an acid is added to the polyol blend. Without the acid present in the polyol mixtures, the emulsion stability is markedly diminished and the resulting foams are less uniform with respect to open-cell content.

The emulsified polyol mixtures of the invention have emulsion droplets or particles having mean diameters of less than about $50\mu$, preferably less than about $25\mu$, more preferably less than about $10\mu$, and most preferably less than about $1\mu$. It is preferred to have a smaller emulsified droplet or particle size to improve the overall stability of the emulsified polyol mixtures to result in improved uniformity of the open celled content of the final polyurethane foams.

The invention provides polyurethane foams suitable for use as insulating materials disposed on or between a variety of substrates. Suitable substrate materials comprise metal such as aluminum or sheet metal; wood, including composite wood, acrylonitrile-butadiene-styrene (ABS) triblock of rubber, optionally modified with styrene-butadiene diblock, styrene-ethylene/butylene-styrene triblock, optionally functionalized with maleic anhydride and/or maleic acid; polyethylene terephthalate, polycarbonate, polyacetals, rubber modified high impact polystyrene (HIPS), blends of HIPS with polyphenylene oxide; copolymers of ethylene and vinyl acetate, ethylene and acrylic acid, ethylene and vinyl alcohol; homopolymers or copolymers of ethylene and propylene such as polypropylene, high density polyethylene, high molecular weight high density polyethylene, polyvinyl chloride, nylon 66, or amorphous thermoplastic polyesters, fiberglass or fiberglass composites.

The foams of the invention have in-place densities of from about 1.85 to 2.5, and preferably from about 1.9 to 2.4, lbs./ft.$^3$ (pcf).

As explained in more detail below, the foams of the invention may be water blown foams. The water blown foams according to the invention have K-factors of at least about 0.17 to 0.24.

The polyurethane foam of the invention comprises the aromatic polyisocyanate with a polyol component. The polyurethane foam is rigid, meaning that the ratio of tensile strength to compressive strength is high, on the order of 0.5 to 1 or greater, and has less than 10 percent elongation.

Polyisocyantate

The polyisocyanate starting components used according to the present invention include aliphatic, cycloaliphatic, araliphatic, aromatic and heterocyclic polyisocyanates, such as those described, for example, by W. Siefken in Justus Liebigs Annalen der Chemie 562: 75–136. Examples include ethylene diisocyanate; tetramethylene-1,4-diisoyanate, hexamethylene-1,6-diisocyanate; dodecane-1, 12-diisocyanate; cyclobutane-1,3-diisocyanate; cyclohexane-1,3- and 1,4-diisocyanate and mixtures of these isomers 1-isocyanato-3,3,5-trimethyl-5-isocyanatomethylcyclohexane (German Auslegeschrift No. 1,202,785, U.S. Pat. No. 3,401,190); hexahydrotolylene-2,4- and 2,6-diisocyanate and mixtures of these isomers; hexahydrophenylene-1,3- and/or -1,4-diisocyanate; perhydrodiphenylmethane-2,4'- and/or 4,4'-diisocyanate; phenylene-1,3- and -1,4-diisocyanate; tolylene-2,4- and -2,6-diisocyanate and mixtures of these isomers; diphenylmethane-2,4'- and/or -4,4'-diisocyanate; naphthylene-1,5-diisocyanate; triphenylmethane-4,4',4"-triisocyanate; polyphenylpolymethylene polyisocyanate which may be obtained by aniline/formaldehyde condensation followed by phosgenation and which have been described, for example, in British Pat. Nos. 874,430 and 848,671; m- and p-isocyanatophenyl sulphonyl isocyanate according to U.S. Pat. No. 3,454,606; perchlorinated aryl polyisocyanate as described, for example, in U.S. Pat. No. 3,277,138; polyisocyanate; containing carbodiimide groups as described in U.S. Pat. No. 3,152,162; the diisocyanates described in U.S. Pat. No. 3,492,330; polyisocyanates containing allophanate groups as described, for example, in British Pat. No. 994,890, Belgian Pat. No. 761,626 and Published Dutch Patent application No. 7,102,524; polyisocyanates containing isocyanurate groups as described, for example, in U.S. Pat. No. 3,001,973, in German Pat. Nos. 1,022,789; 1,222,067 and 1,027,394 and in German Offenlegungsschriften Nos. 1,929,034 and 2,004,048; polyisocyanates containing urethane groups as described, for example, in Belgian Pat. No. 752,261 or in U.S. Pat. No. 3,394,164; polyisocyanates containing acrylated urea groups according to German Pat. No. 1,230,778; polyisocyanates containing biuret groups as described, for example, in U.S. Pat. Nos. 3,124,605 and 3,201,372; and in British Pat. No. 889,050; polyisocyanates prepared by telomerization reactions as described, for example in U.S. Pat. No. 3,654,016; polyisocyanates containing ester groups as mentioned, for example, in British Pat. Nos. 965,474 and 1,072,956, in U.S. Pat. No. 3,567,763 and in German Pat. No. 1,231,688; reaction product of the above-mentioned isocyanates with acetals according to German Pat. No. 1,072,385; and, polyisocyanates containing polymeric fatty acid groups as described in U.S. Pat. No. 3,455,883.

The distillation residues obtained from the commercial production of isocyanates and which still contain isocyanate groups may also be used, optionally dissolved in one or more of the above-mentioned polyisocyanates. Mixtures of the above-mentioned polyisocyanates may also be used.

The polyisocyanates which are readily available are generally preferred, for example, toluene-2,4- and -2,6-diisocyanate and mixtures of these isomers ("TDI"); polyphenyl polymethylene polyisocyanates which may be obtained by aniline/formaldehyde condensation followed by phosgenation crude MDI"); and, polyisocyanates containing carbodiimide groups, urethane groups, allophanate groups, isocyanurate groups, urea groups or biuret groups ("modified polyisocyanates").

A presently preferred polyisocyanate is methylene bis (phenyl isocyanate).

In a typical rigid pour-in-place foam application, the polyisocyanate mixture is reacted with a polyol blend at from about a 0.85:1 to 3:1 (v/v) ratio. A preferred ratio of polyisocyante to polyol blend for use in pour-in-place applications is from about 1.3:1 to 1.6:1 (v/v). The NCO/OH index in reactions according to the invention is less than about 130, preferably from about 75 to 125, and more preferably from about 85 to 125. The reaction can be achieved using a spray gun apparatus or other suitable mixing devices. Alternatively, the reaction can be achieved using a high pressure impingement machine provided with a nozzle capable of filling a void volume. As another alternative, the reaction may be achieved using a low pressure static mixing machine equipped with a nozzle to fill a void volume.

Polyol Component

Starting polyol components suitable for use in the polyol blends or mixtures according to the present invention include polyesters containing at least two hydroxyl groups, as a rule having a molecular weight of from 300 to 10,000, in particular polyesters containing from 2 to 8 hydroxyl groups, preferably those having a molecular weight of from 350 to 700, more preferably from 350 to 600, wherein the acid component of these polyesters comprise at least 50%, by weight, preferably at least 70%, by weight, of phthalic acid residues.

These polyesters containing hydroxyl groups include for example, reaction products of polyhydric, preferably dihydric and optionally trihydric, alcohols with phthalic acids and other polybasic, preferably dibasic, carboxylic acids. Instead of using the free phthalic acids or polycarboxylic acids, the corresponding acid anhydrides or corresponding acid esters of lower alcohols or mixtures thereof may be used for preparing the polyesters. Orthophthalic acids, isophthalic acids and/or terephthalic acids may be used as the phthalic acid. The optional polybasic-carboxylic acids may be aliphatic, cycloaliphatic, aromatic and/or heterocyclic and may be substituted, for example, with halogen atoms and/or may be unsaturated. The following are mentioned as examples; succinic acid, adipic acid, suberic acid, azelaic acid, sebacic acid, trimellitic acid, tetrahydrophthalic acid anhydride, hexahydrophthalic acid anhydride, endomethylene tetrahydro phthalic acid anhydride, glutaric acid anhydride, maleic acid, maleic acid anhydride, fumaric acid, dimeric and trimeric fatty acids, such as oleic acid, optionally mixed with monomeric fatty acids. Suitable polyhydric alcohols include, for example, ethylene glycol, propylene glycol-(1,2) and -(1,3), diol-(1,8), neopentyl glycol, cyclohexane dimethanol (1,4-bis-hydroxymethylcyclohexane), 2-methyl-1,3-propane diol, glycerol, trimethylolpropane, hexanetriol-(1,2,6) butane triol-(1,2,4), trimethylolethane, pentaerythritol, quinitol, mannitol and sorbitol, methylglycoside, also diethylene glycol, triethylene glycol, tetrathylene glycol, polyethylene glycols, dibutylene glycol, and polybutylene glycols. The polyesters may also contain carboxyl end groups. Polyesters of lactones, such as $\epsilon$-caprolactone, or hydroxycarboxylic acids, such as $\delta$-hydroxycaproic acid, may also be used.

Particularly preferred polyester polyols for use in the invention comprise the reaction products of (a) phthalic acid compounds, (b) low molecular weight aliphatic diol compounds, (c) and nonionic surfactant compounds. Such polyester polyols are described in U.S. Pat. Nos. 4,644,047 and 4,644,048, each of which is incorporated herein in its entirety.

According to the present invention, polyethers containing at least one, generally from 2 to 8, preferably 3 to 6, hydroxyl groups and having a molecular weight of from 100 to 10,000 of known type may be used in the polyol blend. These are prepared, for example, by the polymerization of epoxides, such as ethylene oxide, propylene oxide, butylene oxide, tetrahydrofuran, styrene oxide, or epichlorohydrin, either on its own for example in the presence of $BF_3$, or by chemical addition of these epoxides, optionally as mixtures or successively, to starting components having reactive hydrogen atoms, such as alcohols or amines, for example water, ethylene glycol, propylene glycol-(1,3) or -(1,2), trimethylol propane, 4,4-dihydroxy diphenylpropane aniline, ammonia ethanolamine or ethylene diamine. Sucrose polyethers which have been described, for example in German Auslgeschrift Nos. 1,176,358 and 1,064,938 may also be used according to the present invention.

Among the corresponding polythioethers which may also be used are the condensation products obtained from thiodiglycol on its own and/or with other glycols, dicarboxylic acids, formaldehyde, aminocarboxylic acids or aminoalcohols should be particularly mentioned. The products obtained are polythio mixed ethers, polythio ether esters or polythio ether ester amides, depending on the co-components.

Polyhydroxyl compounds already containing urethane or urea groups and modified or unmodified natural polyols, such as castor oil, carbohydrates or starch may also be used. Addition products of alkylene oxides and phenyl/formaldehyde resins or of alkylene oxides and urea/formaldehyde resins are also suitable according to the present invention.

Representatives of these compounds which may be used according to the present invention have been described, for example, in High Polymers, Volume XVI, "Polyurethanes, Chemistry and Technology", by Saunders and Frisch, Interscience Publishers, New York; London, Volume I, 1962, pages 32–42 and pages 44 to 54 and Volume II, 1964, pages 5 and 6 and 198–199, and in Kunststoff-Handbuch, Volume VII, Vieweg-Hochtlen, Carl-Hanser-Verlag, Munich, 1966, for example, on pages 45 to 71.

Acid Component

The preferred polyol formulation used in the invention comprises a polyester polyol and an acid in an amount capable of maintaining the emulsified polyol mixture as an emulsion for a period of time sufficient to allow for the production of a polyurethane foam having a uniform open celled content by reacting the polyol mixture with an aromatic polyisocyanate. Preferred polyol formulations comprise at least about 10% by weight of a polyester polyol. More preferred polyol formulations comprise at least about 45% of a polyester polyol; most preferred polyol formulations comprise at least about 60% by weight of polyester polyol. In these formulations, the balance of the polyol formulation is typically a polyether polyol.

The amount of acid needed to achieve the requisite emulsion stability is generally up to about 5% by weight of the polyol mixture. Preferred amounts of the acid are from about 0.05 to 5% by weight of the polyol mixture. More preferably, the amount of acid is from about 0.1 to 1%.

Suitable acids are Bronsted acids, i.e., substances that can donate protons. Preferred acids are organic acids. Particularly preferred acids are various alkanoic or alkenoic acids of the formula $RCO_2H$, where R is hydrogen, a straight or branched chain alkyl group having from about 1 to 12 carbon atoms, or a straight or branched chain alkenyl group having from about 2 to 12 carbon atoms. Representative acids include, for example, formic, acetic, isobutryic, and 2-ethylhexanoic acids. A preferred acid is 2-ethylhexanoic acid.

Blowing Agent

According to the invention, the reaction of the emulsified polyol mixture as set forth above with a polyisocyanate provides an open cell rigid polyurethane foam as desired. It is preferred that water is used as a primary blowing agent in the emulsified polyol mixture. The amount of water as a blowing agent is about 3–10 parts by weight, and preferably about 5–8 parts by weight, based on 100 parts by weight of the polyol mixture. When the amount of water is insufficient, a low density foam may not be produced.

Although it is preferred to carry out the preparation of the foam using an emulsified polyol mixture having water as a primary blowing agent, if necessary, the blowing agent may be a secondary blowing agent alone, or a mixture of water and a secondary blowing agent. Suitable secondary blowing agents include both CFC and non-CFC blowing agents. Those secondary blowing agents are typically liquids having low boiling points.

Suitable blowing agents include, but are not limited to, halogenated hydrocarbons such as, for example, 2,2-dichloro-2-fluoroethane (HCFC-141b), water, and hydrocarbons such as pentane hydrofluorocarbons (HCFCs) and perfluorocarbons for example. Other suitable organic blowing agents include, for example, acetone, ethyl acetate, halogenated alkanes, such as methylene chloride, chloroform, ethylidene chloride, vinylidene chloride, and also butane, pentane, hexane, heptane or diethylether. The effect of a blowing agent may also be obtained by adding compounds which decompose at temperatures above room temperature to liberate gases, such as nitrogen, for example, azo compounds, such as azoisobutyric acid nitrile. Other examples of blowing agents and details about the use of blowing agents may be found in Kunststoff-Handbuch, Volume VII, published by Vieweg-Hochtlen, Carl-Hanser-Verlag, Munich, 1966, for example, on pages 108 and 109, 453 to 455 and 507–510.

Further examples of suitable blowing agents are described in U.S. Pat. Nos. 5,346,928, which is incorporated herein in its entirety.

Cell Opening Agent

Cell opening agents suitable for use in the invention include known powdered divalent metal salts of long chain fatty acids having from about 1–22 carbon atoms. Examples of such agents are divalent metal salts of stearic or myristic acid, such as calcium stearate, magnesium stearate, strontium stearate, zinc stearate or calcium myristate, as disclosed in Japanese Patent Application Laid-open No. 61-153480. The cell opening agent may be used in an amount of about 0.01–1.5 parts by weight based of the polyol mixture.

Preferred cell opening agents have melting or softening points of from about 100 to 180° C. Preferred emulsified polyol mixtures comprise from about 0.05 to 1.0 parts of cell opening agent to 100 parts of polyol mixture. More preferred emulsified polyol mixtures comprise from about 0.05 to 0.25 parts of cell opening agent to 100 parts of polyol mixture. Satisfactory foams are prepared according to the invention using emulsified polyol mixtures comprising from about 0.05 to 0.25 parts by weight of cell opener where the mixture is emulsified in the presence of an acid.

Isocyanate Polymerization Catalyst

Compounds which readily initiate a polymerization reaction of the NCO-groups at temperatures as low as room temperature are used as the catalyst system for polymerization. Compounds of this type are described, for example, in French Pat. No. 1,441,565, Belgian Pat. Nos. 723,153 and 723,152 and German Pat. No. 1,112,285.

Such catalyst systems are, in particular, mononuclear or polynuclear Mannich bases of condensable phenols, oxo-compounds and secondary amines which are optionally substituted with alkyl groups, aryl groups or aralkyl groups, preferably those in which formaldehyde is used as the oxo-compound and dimethylamine as the secondary amine.

According to the present invention, the catalysts that may be used as the catalyst for the polyurethane reaction include, for example, tertiary amines, such as triethylamine, tributylamine, N-methyl morpholine, N-ethyl-morpholine, N-cocomorpholine, N,N,N', N'-tetramethylethylenediamine, 1,4-diaza-bicyclo-(2,2,2)-octane, N-methyl-N'-dimethyl aminoethyl-piperazine, N,N-dimethylbenzylamine, bis-(N, N-diethylaminoethyl)-adipate, N,N-diethylbenzylamine, pentamethyldiethylenetriamine, N,N-dimethylcyclohexylamine, N,N,N',N'-tetramethyl-1,3-butane-diamine, N,N-dimethyl-β-phenylethylamine, 1,2-dimethylimidazole and 2-methylimidazole.

Tertiary amines containing isocyanate-reactive hydrogen atoms used as catalysts include, for example, triethanolamine, triisopropanolamine, N-methyl-diethanolamine, N-ethyl-diethanolamine, N,N-dimethylethanolamine and the reaction products thereof with alkylene oxides, such as propylene oxide and/or ethylene oxide.

Silaamines having carbon-silicon bonds as described, for example, in German Pat. No. 1,229,290 (corresponding to U.S. Pat. No. 3,620,984) may also be used as catalysts, for example, 2,2,4-trimethyl-2-silamorpholine and 1,3-diethylaminomethyl-tetramethyl-disiloxane.

The catalysts used may also be basic nitrogen compounds, such as tetralkylammonium hydroxides, alkali metal hdyroxides, such as sodium hydroxide, alkali metal phenolates, such as sodium phenolate, or alkali metal alcholates, such as sodium methylate. Hexahydrotriazines may also be used as catalysts. Typically, the amine catalyst is employed in excess of the required acid. However, any of the catalysts derived from amines may be used in the invention as the corresponding ammonium salts or quaternary ammonium salts. Thus, in the practice of the invention, catalysts derived from amines may be present in the polyol mixtures as their corresponding acid blocked form. Accordingly, in certain embodiments, such a catalyst and the requisite acid may be simultaneously added conveniently as the amine salt of the acid.

According to the present invention, organic metal compounds, in particular organic tin compounds, may also be used as catalysts.

Suitable organic tin compounds are preferably tin(II)-salts of carboxylic acids, such as tin(II)-acetate, tin(II)-octoate, tin(II)-ethylhexoate and tin(II)-laurate, and the tin(IV)-compounds, for example dibutyl tin oxide, dibutyl tin dichloride, dibutyl tin diacetate, dibutyl tin dilaurate, dibutyl tin maleate or dioctyl tin diacetate.

Suitable organo lead compounds for use as primary catalysts include lead naphthanate and lead octoate.

All of the above-mentioned catalysts may be used as mixtures.

Further representatives of catalysts which may be used according to the present invention, as well as details on the mode of operation of the catalyst are described in Kunststoff-Handbuch, Volume III, published by Vieweg-Hochtlen, Carl-Hanser-Verlag, Munich, 1966, for example, on pages 96 to 102.

Other catalysts include N,N-dimethyl-cyclohexylamine, lead naphthanate, tin octanoate and tin dilaurate.

Still other catalysts suitable for use in the invention include amino acid salt catalysts, e.g., those derived from sarcosine. Suitable amino salts derived from sarcosine include various N-(2-hydroxy or 2-alkoxy-5-alkylphenyl) alkyl sarcosinates. The alkyl groups are independently $C_1$–$C_{18}$ alkyl groups and the alkoxy groups are $C_1$–$C_6$ alkoxy groups. Of course, each of the sarcosinate derivatives includes a suitable counterion, such as, for example, sodium, potassium, magnesium, lithium, etc. A presently preferred amino acid salt is sodium N-(2-hydroxy-5-nonylphenyl) methyl sarcosinate. Each of the amino acid derivatives may be prepared according to the procedures set forth in U.S. Pat. No. 3,903,018. Representative amino acid salt catalysts are, for example, sodium N-(2-hydroxy-5-methylphenyl)methyl sarcosinate; sodium N-(2-hydroxy-5-ethylphenyl)methyl sarcosinate; sodium N-(2-hydroxy-5-butylphenyl)methyl sarcosinate; sodium N-(2-hydroxy-5-heptylphenyl)methyl sarcosinate; sodium N-(2-hydroxy-5-nonylphenyl)methyl sarcosinate; sodium N-(2-hydroxy-5-dodecylphenyl)methyl sarcosinate; potassium N-(2-hydroxy-5-nonylphenyl) methyl sarcosinate; lithium N-(2-hydroxy-5-nonylphenyl) methyl sarcosinate; and mixtures thereof. Other suitable catalysts include, for example, the disodium salt of 2,6-bis-(N-carboxymethyl-N-methylaminomethyl)-p-ethylphenol and the disodium salt of 2,6-bis-(N-carboxymethyl-N-methlaminomethyl)-p-nonylphenol; and mixtures thereof.

The catalysts are generally used in a quantity of from about 0.001 to 10%, by weight, based on the quantity of the polyesters used according to this invention.

Additives

According to the present invention, surface-active additives, such as emulsifiers and foam stabilizers, may also be used. Suitable emulsifiers include, for example, the sodium salts of ricinoleic sulphonates, or salts of fatty acids and amines, such as oleic acid diethylamine or stearic acid diethanolamine. Alkali metal or ammonium salts of sulphonic acids, such as dodecyl benzene sulphonic acid or dinaphthylmethane, disulphonic acid or of fatty acids, such as ricinoleic acid, or of polymeric fatty acids may also be used as surface-active additives.

The foam stabilizers used are mainly polyether siloxanes, especially those which are water-soluble. These compounds generally have a polydimethyl siloxane group attached to a copolymer of ethylene oxide and propylene oxide. Foam stabilizers of this type have been described, for example, in U.S. Pat. Nos. 2,834,748; 2,917,480 and 3,629,308.

According to the present invention, it is also possible to use known cell regulators such as paraffins or fatty alcohols or dimethyl polysiloxanes, as well as pigments or dyes and known flame-proofing agents, for example, trischloroethylphosphate, tricresylphosphate or ammonium phosphate or polyphosphate, also stabilizers against ageing and weathering, plasticizers, fungistatic and bacteriostatic substances and fillers, such as barium sulphate, kieslguhr, carbon black or whiting.

Other examples of surface-active additives, foam stabilizers, cell regulators, reaction retarders, stabilizers, flame-proofing substances, plasticizers, dyes, fillers and fungistatic and bacteriostatic substances which may also be used according to the present invention and details concerning the use and action of these additives may be found in Kunststoff-Handbuch, Volume VII, published by Vieweg and Hochtlen, Carl-Hanser-Verlag, Munich 1966, for example on pages 103 and 113.

Emulsifiers

The polyol mixtures may optionally include emulsifiers to prolong the stability and shelf-life of the emulsified polyol mixtures. Examples of suitable emulsifiers include sodium N-(2-hydroxy-5-nonylphenyl)methyl sarcosinate.

All documents, e.g., patents and journal articles, cited above or below are hereby incorporated by reference in their entirety.

One skilled in the art will recognize that modifications may be made in the present invention without deviating from the spirit or scope of the invention. The invention is illustrated further by the following examples which are not to be construed as limiting the invention or scope of the specific procedures described herein.

The following is a description of certain materials used in the following examples:

| | |
|---|---|
| Markol RB-317 | an alkoxylated sucrose glycerine initiated polyol having an OH value of about 345–375, sold by Quimica Pumex. |
| Markol RB-318 | an alkoxylated sucrose glycerine having an OH value of about 355–385, sold by Quimica Pumex. |
| Stepanpol PS-2352 | a modified diethylene glycol phthalate polyester polyol having an OH value of about 220–250, sold by Stepan Company, Northfield, Illinois. |
| Stepanpol PS-3152 | a diethylene glycol phthalate polyester polyol having an OH value of about 290–325, sold by Stepan Company, Northfield, Illinois. |
| Stepanpol ®PS-2502-A: | a modified diethylene glycol phthalate polyester polyol having an OH value of about 230–250, sold by Stepan Company, Northfield, Illinois. |
| Poly G 85-36: | an alkoxylated glycerine polyether polyol having an OH value of about 36, sold by Olin Corp. |
| M4030: | an alkoxylated sucrose glycerin initiated polyether polyol having an OH value of about 375–395, sold by Bayer, Inc., Pittsburgh, Pennsylvania. |
| Dabco ®DC5357: | a polysiloxane surfactant composed of dimethyl, methyl (polyethylene oxide) siloxane copolymer, sold by Air Products Corporation of Allentown, Pennsylvania. |
| Tegostab B8404: | a polysiloxane surfactant composed of dimethyl, methyl (polyethylene oxide) siloxane copolymer, sold by Godlschmidt. |
| Niax ®A-1: | a catalyst which contains about 70% bis(2-dimethylaminoethyl) ether in 30% dipropylene glycol, sold by OSI Specialty Chemical. |
| Mondur MR ®: | polymethylene polyphenyl isocyanate having an isocyanate content of about 31.5%, commercially available from Bayer, Pittsburgh, Pennsylvania. |
| Thanol R-360: | an alkoxylated sucrose glycerin initiated polyether polyol having an OH value of about 345–375, sold by Eastman. |
| Polycat 8 | Dimethylcyclohexylamine catalyst, sold by Air Products. |
| Jeffcat ZR-70 | a catalyst containing 2-(2-(dimethylamino)ethoxy]ethanol, sold by Huntsman |

In each of the following examples, the polyisocyanate employed is Mondur MR®. Further, amounts of components in the examples are parts by weight unless indicated otherwise.

EXAMPLE 1

The following polyol mixtures were prepared according to the invention and reacted with a polyisocyanate (Mondur MR®) in an amount of 300 g of total material at the index indicated to produce a polyurethane free rise cup foam. The foams are prepared in a 128 ounce No. 10 cup. The properties of the resulting foam are indicated below. Both foams were detemined to be open celled by heating in an oven at 158° F. and 100% relative humidity (r.h.) and showing little or no shrinkage.

| Component | Mixture 1 | Mixture 2 |
|---|---|---|
| PS2502A | 83 | 83 |
| M-4030 | 9 | 9 |
| Poly G 85-36 | 8 | 8 |
| Water | 7 | 7 |
| DC-5357 | 0.75 | 0.75 |
| Calcium Stearate | 1.0 | 0.25 |
| Niax A-1 | 0.25 | 0.25 |
| sodium N-(2-hydroxy-5-nonylphenyl)methyl sarcosinate (SHNMS) | 0.50 | 0.50 |
| DEG (diethylene glycol) | 1.13 | 1.13 |
| TEA | 0.75 | 0.75 |
| Index | 105 | 105 |
| Component Temps. | 90/90 | 90/90 |
| Initiation (Cream) time | 11 sec. | 11 sec. |
| Top of Cup | 29 sec. | 28 sec. |
| Gel Time (string time) | 40 sec. | 39 sec. |
| End of Rise | 55 sec. | 67 sec. |
| Cup Density | 1.54 pcf | 1.44 pcf |

EXAMPLE 2

Samples of polyol mixture 2 was reacted with a polyisocyanate at the index indicated to produce a polyurethane foam in a 12 inch×12 inch×2 inch mold. The properties of the resulting foams are indicated below.

| | Run #1 (210 g) | Run #2 (205 g) | Run #3 (200 g) |
|---|---|---|---|
| Polyol mixture No. | mixture 2 | mixture 2 | mixture 2 |
| Index | 105 | 105 | 105 |
| Foam Weight | 159 g | 156.9 g | 153.6 g |
| Foam Density | 2.10 pcf | 2.07 pcf | 2.03 pcf |
| Mold Temperature | 120° F. | 120° F. | 120° F. |
| Demold Time (minutes) | 6 | 6 | 6 |
| Maximum Demold Expansion (inches) | 0.087 | 0.075 | 0.053 |
| % Pack | 9.7% | 8.2% | 5.9% |
| K-Factor | 0.236 | | |

| | Run #4 (195 g) | Run #5 (190 g) | Run #6 (185 g) |
|---|---|---|---|
| Polyol mixture no. | mixture 2 | mixture 2 | mixture 2 |
| Index | 105 | 105 | 105 |
| Foam Weight | 151.7 g | 147.7 g | 141.7 g |
| Foam Density | 2.00 pcf | 1.95 pcf | 1.87 pcf |
| Mold Temperature | 120° F. | 120° F. | 120° F. |
| Maximum Demold Time (minutes) | 6 | 6 | 6 |
| Maximum Demold Expansion (inches) | 0.026 | 0.00 | Slight underfill |
| % Pack | 4.6% | 1.9% | |
| K-Factor | 0.238 | | |

EXAMPLE 3

The following polyol mixture was preparared according to the invention and reacted with a polyisocyanate at the index indicated to produce a free rise cup polyurethane foam. The properties of the resulting foam are indicated below.

| | Mixture 3 |
|---|---|
| PS2502A | 83 |
| M-4030 | 9 |

-continued

| | Mixture 3 |
|---|---|
| Poly G 85-36 | 8 |
| Water | 7 |
| B-8404 | 1.5 |
| Calcium Stearate | 0.25 |
| Niax A-1 | 0.25 |
| SHNMS | 0.50 |
| DEG | 1.13 |
| TEA | 0.75 |
| Index | 105 |
| Component Temps. | 90/90 |
| Initiation | 10 sec. |
| Top of Cup | 28 sec. |
| Gel Time | 38 sec. |
| End of Rise | 71 sec. |
| Cup Density | 1.42 pcf |
| open celled as determined by heating at 158° F. and 100% r.h. | yes |

EXAMPLE 4

The following polyol mixture was preparared according to the invention and reacted with a polyisocyanate at the index indicated to produce a free rise cup polyurethane foam. The properties of the resulting foam are indicated below.

| | Mixture 4 |
|---|---|
| PS2502A | 83 |
| M-4030 | 9 |
| Poly G 85-36 | 8 |
| Water | 7 |
| B-8404 | 1.5 |
| Zinc Stearate | 0.35 |
| Niax A-1 | 0.25 |
| SHNMS | 0.50 |
| DEG | 1.13 |
| TEA | 0.75 |
| Index | 105 |
| Component Temps. | 90/90° F. |
| Initiation Time | 11 sec. |
| Top of Cup | 27 sec. |
| Gel Time | 38 sec. |
| End of Rise | 70 sec. |
| open celled as determined by heating at 158° F. and 100% r.h. | yes |

EXAMPLE 5

The following polyol mixture was preparared according to the invention and reacted with a polyisocyanate at the index indicated to produce a free rise cup polyurethane foam. The properties of the resulting foam are indicated below.

| | Mixture 5 | Mixture 6 | Mixture 7 |
|---|---|---|---|
| PS2502A | 83 | 83 | 83 |
| M-4030 | 9 | 9 | 9 |
| Poly G 85-36 | 8 | 8 | 8 |
| Water | 7 | 7 | 7 |
| B-8404 | 1.5 | 1.5 | 1.5 |
| Calcium Stearate | 0.25 | 0.25 | 0.25 |
| Niax A-1 | 0.25 | 0.25 | 0.25 |
| DEG | 1.13 | 1.13 | 1.13 |
| TEA | 0.75 | 0.75 | 0.75 |
| SHNMS | — | — | 0.50 |
| Index | 105 | 95 | 95 |
| Initiation | 11 sec. | 11 sec. | 11 sec. |
| Top of Cup | 30 sec. | 31 sec. | 31 sec. |
| Gel Time | 43 sec. | 42 sec. | 41 sec. |
| End of Rise | 69 sec. | 78 sec. | 81 sec. |
| Cup Density | 1.43 pcf | 1.41 pcf | 1.39 pcf |
| Open celled as determined by heating at 159° F. and 100% r.h. | yes | yes | yes |

EXAMPLE 6

The following polyol mixture was preparared according to the invention and reacted with a polyisocyanate at the index indicated to produce a free rise cup polyurethane foam. The properties of the resulting foam are indicated below.

| | Mixture 8 | Mixture 9 | Mixture 10 |
|---|---|---|---|
| PS2502A | 83 | 83 | 83 |
| M-4030 | 9 | 9 | 9 |
| Poly G 85-36 | 8 | 8 | 8 |
| Water | 7 | 7 | 7 |
| B-8404 | 1.5 | 1.5 | 1.5 |
| Calcium Stearate | 0.35 | 0.50 | 0.50 |
| Niax A-1 | 0.25 | 0.25 | 0.25 |
| DEG | 1.13 | 1.13 | 1.13 |
| TEA | 0.80 | 0.80 | 0.75 |
| SHNMS | — | — | 0.50 |
| Index | 105 | 105 | 105 |
| Component Temps. | 90/90 | 90/90 | 90/90 |
| Initiation | 11 sec. | 11 sec. | 10 sec. |
| Top of Cup | 29 sec. | 30 sec. | 28 sec. |
| Gel Time | 41 sec. | 42 sec. | 39 sec. |
| End of Rise | 78 sec. | 74 sec. | 70 sec. |
| Cup Density | 1.44 pcf | 1.44 pcf | 1.41 pcf |
| Type of foam as determined by heating at 158° F. and 100% r.h. | yes | yes | yes |

EXAMPLE 7

1. Polyol mixture number 9 was reacted with a polyisocyanate at the index indicated to produce free rise cup polyurethane foams. The properties of the resulting foams are indicated below.

| Polyol mixture no. | Hand Mix mixture 9 | High pressure machine Shot mixture 9 |
|---|---|---|
| Index | 105 | 105 |
| Component Temps. | 90/90 | 85/85 |
| Initiation Time | 10 sec. | 10 sec. |
| Top of Cup | 30 sec. | 28 sec. |
| Gel Time | 42 sec. | 41 sec. |
| End of Rise | — | 73 sec. |
| Cup Density | 1.46 pcf | 1.46 pcf |

-continued

| Polyol mixture no. | Hand Mix mixture 9 | High pressure machine Shot mixture 9 |
|---|---|---|
| Open celled as shown by heating at 158° F. and 100% r.h. | yes | yes |

2. Polyol mixture number 9 was reacted with a polyisocyanate at the index indicated and shot into standard doors and demolded after 5 minutes. The properties of the resulting foams are indicated below.

Door #1

105 Index—105° F. plate temps. 5 minute demold. Filled within about 40 seconds.

5.05 lb foam; 2.03 pcf in place; small over pack.

Door #2

95 Index—105° F. plate temps. 5 minute demold. Filled within 39 seconds.

5.05 lb. foam; 2.0 pcf in place; small overpack.

Door #3

95 Index—130° F. plate temps. 5 minute demold. Filled within 34 seconds.

4.30 lb. foam; 1.91 pcf in place; overpacked.

Door #4

105 Index—130° F. plate temp. 5 minute demold. Filled within 39 seconds.

4.70 lb. foam; 1.87 pcf in place; overpacked.

EXAMPLE 8

The following polyol mixtures were preparared according to the invention and reacted with a polyisocyanate at the index indicated to produce a polyurethane foam. The properties of the resulting foam are indicated below.

|  | Mixture 11 | Mixture 12 | Mixture 13 |
|---|---|---|---|
| PS2502A | 83 | 83 | 83 |
| M-4030 | 9 | 9 | 9 |
| Poly G 85-36 | 8 | 8 | 8 |
| Water | 6.5 | 6.5 | 6.5 |
| B-8404 | 1.5 | 1.5 | 1.5 |
| Calcium Stearate | 0.50 | 0.50 | 0.75 |
| Niax A-1 | 0.25 | 0.25 | 0.25 |
| SHNMS | 0.50 | 0.50 | 0.50 |
| DEG | 1.13 | 1.13 | 1.13 |
| TEA | 0.75 | 0.75 | 0.75 |
| Index | 105 | 105 | 105 |
| Component Temps. (° F.) | 90/90 | 90/90 | 90/90 |
| Initiation | 10 sec. | 10 sec. | 11 sec. |
| Top of Cup | 29 sec. | 30 sec. | 28 sec. |
| String Time | 39 sec. | 39 sec. | 39 sec. |
| End of Rise | 70 sec. | 73 sec. | 75 sec. |
| Cup Density | 1.47 pcf | 1.46 pcf | 1.46 pcf |
| Open celled as determined by heating at 158° F. and 100% r.h. | yes | yes | yes |

EXAMPLE 9

1. The following polyol mixture was prepared according to the invention and reacted with a polyisocyanate at the index indicated to produce a polyurethane foam. The properties of the resulting foam are indicated below.

| Component | parts by weight | hydroxyl value | Equivalents |
|---|---|---|---|
| PS2502A | 83.00 | 245 | 0.3625 |
| M-4030 | 9.00 | 384 | 0.0616 |
| Poly G 85-36 | 8.00 | 36 | 0.0051 |
| Water | 6.50 | 6233 | 0.7222 |
| B-8404 | 1.50 | | |
| Calcium Stearate | 0.75 | | |
| Niax A-1 | 0.25 | | |
| SHNMS | 0.50 | | |
| DEG | 1.13 | 1058 | 0.0213 |
| TEA | 0.75 | | |
|  | 111.36 | | 1.1727 |
| Wt. Ratio (A/B) | | | 1.470 |
| Parts by weight of isocyanate | | | 59.5 |
| Parts by weight of polyol mixture 14 | | | 40.5 |
| NCO/OH Index | | | 105 |

2. Polyol mixture 14 was reacted as described above with an isocyanate at the following indexes and molded in 15×15×4 inch metallic pans having a closable lid and polyethylene liner to yield foams having the following properties.

| Mixture 14 at 100 Index | | | |
|---|---|---|---|
| Test | Direction | Sample density[2] (pcf) | Strength (psi) |
| Compressive Strength (average[1]) | Parallel | 1.71 | 17.57 |
| Compressive Strength (average) | Perpendicular | 1.64 | 18.53 |
| Tensile Strength (average) | Parallel | 1.61 | 27.62 |
| Shear Strength (average) | Parallel | 1.62 | 22.73 |
| Total Average Core Density of molded foam (pcf) | | | 1.644 |
| Friability (% Wt. Loss) | | | 4.5 |
| Overall Density (pcf) | | | 1.99 |

[1]averages are average of three runs
[2]sample taken from molded foam

| Mixture 14 at 107 Index | | | |
|---|---|---|---|
| Test | Direction | Density | Strength |
| Compressive Strength (average[1]) | Parallel | 1.77 | 19.57 |
| Compressive Strength (average) | Perpendicular | 1.70 | 19.32 |
| Tensile Strength (average) | Parallel | 1.66 | 28.77 |
| Shear Strength (average) | Parallel | 1.66 | 19.55 |

-continued

Mixture 14 at 107 Index

| Test | Direction | Density | Strength |
|---|---|---|---|
| Total average Core Density (pcf) | | | 1.698 |
| Friability (% Wt. Loss) | | | 4.9 |
| Overall Density (pcf) | | | 2.01 |

[1]averages are average of three runs

Mixture 14 at 115 Index

| Test | Direction | Density | Strength |
|---|---|---|---|
| Compressive Strength (average[1]) | Parallel | 1.76 | 18.49 |
| Compressive Strength (average) | Perpendicular | 1.68 | 19.10 |
| Tensile Strength (average) | Parallel | 1.65 | 24.71 |
| Shear Strength (average) | Parallel | 1.65 | 17.71 |
| Total Average Core Density (pcf) | | | 1.687 |
| Friability (% weight loss) | | | 6.3 |
| Overall Density (pcf) | | | 2.00 |

[1]averages are average of three runs

| | | Mixture 14 at 100 index | Mixture 14 at 107 index | Mixture 14 at 115 index |
|---|---|---|---|---|
| Condition: −20° F. % Volume Change (average) | 1 Day | 0.19% | 0.21% | 0.02% |
| | 2 Day | 0.04% | 0.23% | 0.12% |
| | 7 Day | 0.17% | 0.18% | 0.02% |
| | 14 Day | 0.14% | 0.25% | 0.02% |
| | 28 Day | 0.19% | 0.12% | 0.33% |
| | Density | 1.69 | 1.76 | 1.78 |
| Condition: 158° F. % Volume Change (average) | 1 Day | 0.33% | 0.21% | 0.22% |
| | 2 Day | 0.17% | 0.22% | 0.32% |
| | 7 Day | 0.46% | 0.61% | 0.49% |
| | 14 Day | 0.36% | 0.59% | 0.59% |
| | 28 Day | 0.67% | 0.97% | 0.86% |
| | Density | 1.68 | 1.76 | 1.80 |
| Condition: 158° F./100% r.h. % Volume Change (average) | 1 Day | 0.04% | 0.23% | 0.25% |
| | 2 Day | 0.46% | 0.46% | 1.22% |
| | 7 Day | 1.06% | 0.95% | 0.45% |
| | 14 Day | 0.98% | 0.86% | 0.48% |
| | 28 Day | 1.69% | 1.47% | 0.82% |
| | Density | 1.71 | 1.75 | 1.78 |
| Condition 100 F./100% r.h. % Volume Change (average) | 1 Day | 0.89% | 0.93% | 0.49% |
| | 2 Day | 0.69% | 0.78% | 0.68% |
| | 7 Day | 0.70% | 0.78% | 0.61% |
| | 14 Day | 1.00% | 0.97% | 0.63% |
| | 28 Day | 0.73% | 0.89% | 0.41% |
| | Density | 1.68 | 1.76 | 1.82 |

EXAMPLE 10

1. The following polyol mixtures are prepared according to the invention and reacted with a polyisocyanate at the index indicated to produce a free rise cup polyurethane foam. The properties of the resulting foam are indicated below.

| | Mixture 15 | Mixture 16 | Mixture 17 |
|---|---|---|---|
| Thanol R-360 | 100 | 100 | 100 |
| Water | 6.50 | 6.50 | 6.50 |
| B-8404 | 2.25 | 2.25 | 2.25 |
| Calcium Stearate | 0.15 (heated to disperse) | 0.75 | 0.75 (heated to disperse) |
| Niax A-1 | 0.25 | 0.25 | 0.25 |
| SHNMS | 0.50 | 0.50 | 0.50 |
| DEG | 1.13 | 1.13 | 1.13 |
| TEA | 0.75 | 0.75 | 0.75 |
| Index | 105 | 105 | 105 |
| Component Temps. | 90/90 | 90/90 | 90/90 |
| Initiation | 8 sec. | 9 sec. | 8 sec. |
| Top of Cup | 30 sec. | 32 sec. | 31 sec. |
| Gel Time | 50 sec. | 50 sec. | 49 sec. |
| End of Rise | 93 sec. | 95 sec. | 90 sec. |
| Cup Density | 1.42 pcf | 1.45 pcf | 1.44 pcf |
| Open celled after standing in 158° F., 100% r.h. oven[1] | No | No | No |

[1]Where the foam is indicated to not be open celled after standing in the oven, the foam has displayed shrinkage.

EXAMPLE 11

The following polyol mixture was prepared as described above.

| Mixture 18 | |
|---|---|
| PS2502A | 83.00 |
| M-4030 | 9.00 |
| Poly G 85-36 | 8.00 |
| water | 6.50 |
| B-8404 | 1.50 |
| calcium stearate | 0.75 |
| Niax A-1 | 0.25 |
| SHNMS | 0.50 |
| DEG | 1.13 |
| TEA | 0.75 |

Polyol mixture 18 was reacted as described above with a polyisocyanate and shot into doors. The doors had the following dimensions: 34.375×77.625×1.625 inches.

The doors were shot in a vertical orientation with the hinges down and the lock box pointing up. The doors were filled using a Cannon High Pressure Foam Machine with an output of 100 lbs/minute. The doors were shot at a 60/40 isocyanate/polyol mixture weight ratio (1.40 isocyanate/polyol volume ratio) at metal temperatures of about 120° F. and 125° F. The isocyanate and polyol pressures were matched at 1700 psi. The foam was shot to land in the middle of the door. The overall density (in-place density) of the foam was 1.92–1.95 pcf. After cure, the metal skins of the foam were removed, and the foam was cut up in the designated areas to measure core densities. To obtain the core of the foam, the 1.625 inch thick foam was cut to yield the middle 1 inch thick section (core foam). Core densities, in pcf, were determined at the door positions indicated in the following diagram. These densities are listed in the table below for foams shot into two doors secured within presses at 120° F. and 125° F. respectively.

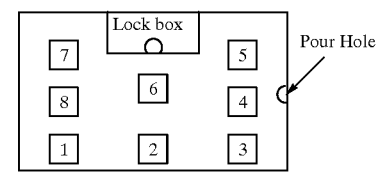

| Door position | Mixture 18, 120° F. | Mixture 18, 125° F. |
|---|---|---|
| 1 | 1.72 | 1.72 |
| 2 | 1.72 | 1.68 |
| 3 | 1.69 | 1.68 |
| 4 | 1.69 | 1.70 |
| 5 | 1.66 | 1.68 |
| 6 | 1.68 | 1.70 |
| 7 | 1.70 | 1.70 |
| 8 | 1.76 | 1.72 |

EXAMPLE 12

| | Mixture 19 | Mixture 20 | Mixture 21 | Mixture 22 |
|---|---|---|---|---|
| RB-317 | 100 | 100 | | |
| PS-2352 | | | 83 | |
| PS-3152 | | | | 83 |
| RB-318 | | | 17 | 17 |
| 2-ethylhexanoic acid | 0.25 | 0.50 | 0.25 | 0.25 |
| calcium stearate | 0.20 | 0.20 | 0.17 | 0.17 |
| water | 6.5 | 6.5 | 6.5 | 6.5 |
| B-8404 | 2.25 | 2.25 | 2.25 | 2.25 |
| Niax A-1 | 0.18 | 0.18 | 0.25 | 0.25 |
| SHNMS | 0.50 | 0.50 | 0.50 | 0.50 |
| Polycat 8 | 0.20 | 0.20 | 0.15 | 0.15 |
| ZR-70 | 0.75 | 0.75 | 0.55 | 0.65 |
| Flame retardant | | | 5.0 | 5.0 |
| Index | 105 | 105 | 105 | 105 |
| Component temperatures (° F.) | 90/90 | 90/90 | 90/90 | 90/90 |
| Initiation (cream, seconds) | 10 | 9 | 9 | 17 |
| Top of cup (seconds) | 38 | 41 | 29 | 47 |
| Gel (string) time (seconds) | 54 | 57 | 36 | 55 |
| End of Rise (seconds) | 105 | 104 | 76 | 106 |
| Cup Density (lbs./ft³, (pcf)) | 1.38 | 1.38 | 1.44 | 1.59 |
| Open celled as determined by heating at 158° F. and 100% r.h. | borderline | yes | yes | yes |

From the foregoing, it will appreciated that although specific embodiments of the invention have been described herein for purposes of illustration, various modifications may be made without deviating from the spirit or scope of the invention.

What is claimed is:

1. A method for preparing a pour-in-place polymeric foam comprising urethane units and having an open-cell content sufficient to resist shrinkage comprising reacting an aromatic polymeric isocyanate with an emulsified polyol mixture at an NCO/OH index of from about 75–125, the polyol mixture comprising (a) a polyol formulation comprising from about 10% to about 100% by weight of a polyester polyol or mixtures of polyester polyols having an OH value of from about 150 to 350 and a molecular weight of from about 350 to 700;

(b) a blowing agent;

(c) a cell opening agent which is a divalent metal salt of a fatty acid; and (d) up to about 5% by weight of an acid based on the weight of the polyol mixture.

2. A method according to claim 1, wherein the polyol mixture further comprises an emulsifier.

3. A method according to claim 2, wherein the polyol mixture comprises less than 1 part of the cell opening agent per 100 parts of the polyol formulation.

4. A method according to claim 3, wherein the polyol mixture comprises from about 0.05 to 1 part of the cell opening agent per 100 parts of the polyol formulation.

5. A method according to claim 4, wherein the cell opening agent has a softening point of from about 100–180° C.

6. A method according to claim 5, wherein the aromatic polymeric isocyanate is a polymethylene polyphenyl isocyanate.

7. A method according to claim 5, wherein the blowing agent comprises water.

8. A method according to claim 5, wherein the cell opening agent is capable of forming a stable emulsion with the polyester polyol.

9. A polyurethane foam according to claim 1 having an in-place density of from about 1.85 to 2.5 lbs./ft³.

10. A pour-in place polyurethane foam comprising from about 0.01 to 0.5% by weight of a cell opening agent which is a divalent metal salt of a fatty acid, the foam having an open-cell content sufficient to resist shrinkage and exhibiting less than about 5% shrinkage when stored at about 158° F. and about 100% relative humidity for about 28 days, the foam comprising the reaction product of an aromatic polymeric isocyanate with an emulsified polyol mixture at an NCO/OH index of from about 75–125, the polyol mixture comprising (a) a polyol formulation comprising from about 10% to about 100% by weight of a polyester polyol or mixtures thereof having an OH value of from about 150 to 350 and a molecular weight of from about 350 to 700;

(b) a blowing agent;

(c) a cell opening agent which is a divalent metal salt of a fatty acid; and (d) up to about 5% by weight of an acid based on the weight of the polyol mixture.

11. A polyurethane foam according to claim 10 exhibiting less than about 3% shrinkage when stored at −20° F. for 28 days.

12. A polyurethane foam according to claim 10, wherein the cell opening agent has a softening point of from about 100–180° C.

13. A method according to claim 1, wherein the acid is an alkanoic acid or an alkenoic acid.

14. A method for preparing a polymeric foam comprising urethane units and having an open-cell content sufficient to resist shrinkage comprising reacting an aromatic polymeric isocyanate with an emulsified polyol mixture at an NCO/OH index of from about 75–125, the polyol mixtures comprising (a) a polyol formulation comprising from about 10% to 100% by weight of a modified diethylene glycol phthalate polyester polyol having an OH value of from about 230 to 250, the polyester polyol comprising the reaction product of a phthalic acid compound, a low molecular weight aliphatic diol, and a nonionic surfactant, the polyol having a molecular weight of from about 350 to 700;

(b) a blowing agent;

(c) a cell opening agent which is a divalent metal salt of a long chain fatty acid; and (d) up to about 5% by weight of an alkanoic or alkenoic acids acid based on the weight of the polyol mixture.

15. A method according to claim 14, wherein the alkanoic or alkenoic acid has the formula $RCO_2H$, where R is hydrogen, a straight or branched chain alkyl group having from about 1 to 12 carbon atoms, or a straight or branched chain alkenyl group having from about 2 to 12 carbon atoms.

* * * * *